United States Patent

Cremer et al.

(10) Patent No.: US 9,031,289 B2
(45) Date of Patent: May 12, 2015

(54) METHOD FOR COMPARING IRIS IMAGES BY THE INTELLIGENT SELECTION OF TEXTURED AREAS

(75) Inventors: Sandra Cremer, Velizy Cedex (FR); Nadége Lemperiere, Velizy Cedex (FR); Sonia Garcia, Gif-sur-Yvette Cedex (FR); Bernadette Dorizzi, Gif-sur-Yvette Cedex (FR)

(73) Assignee: Thales, Courbevoie (FR)

( * ) Notice: Subject to any disclaimer, the term of this patent is extended or adjusted under 35 U.S.C. 154(b) by 190 days.

(21) Appl. No.: 13/995,106

(22) PCT Filed: Dec. 1, 2011

(86) PCT No.: PCT/EP2011/071519
§ 371 (c)(1),
(2), (4) Date: Sep. 19, 2013

(87) PCT Pub. No.: WO2012/079996
PCT Pub. Date: Jun. 21, 2012

(65) Prior Publication Data
US 2014/0301611 A1    Oct. 9, 2014

(30) Foreign Application Priority Data
Dec. 17, 2010    (FR) .................................... 10 04942

(51) Int. Cl.
*G06K 9/00* (2006.01)
*G06K 9/03* (2006.01)

(52) U.S. Cl.
CPC .......... *G06K 9/00597* (2013.01); *G06K 9/0061* (2013.01); *G06K 9/036* (2013.01)

(58) Field of Classification Search
CPC . G06F 3/013; G06F 21/32; G06K 2009/0059; G06K 9/00597; G06K 9/2054
USPC .......................................................... 382/117
See application file for complete search history.

(56) References Cited

U.S. PATENT DOCUMENTS

| 5,291,560 A * | 3/1994 | Daugman ...................... 382/117 |
| 2012/0275707 A1 * | 11/2012 | Bergen et al. ................. 382/199 |

FOREIGN PATENT DOCUMENTS

| EP | 2140401 B1 | 5/2011 |
| WO | 2008145920 A2 | 12/2008 |

OTHER PUBLICATIONS

Emine Krichen, et al., "A New Probabilistic Iris Quality measure for Comprehensive Noise Detection", First IEEE International Conference On Biometrics: Theory Applications, and Systems, Sep. 1, 2007.*

(Continued)

*Primary Examiner* — Stephen R Koziol
*Assistant Examiner* — Shaghayegh Azima
(74) *Attorney, Agent, or Firm* — Baker Hostetler LLP

(57) ABSTRACT

A method for comparing at least two iris images comprises determining M measurements each, of quality level associated with M regions each making up the first and second image. Said measurements are centered on M measurement points, the M measurements of the second image corresponding to the M measurements of the first image by the fact that the M measurement points of the second image correspond to the M measurement points of the first image. The method comprises merging the quality measurements, being obtained by the combination of two corresponding measurements belonging to the two images. The method also comprises selecting N regions exhibiting the N highest quality levels. The method also comprises encoding the two images by using the N selected regions to obtain a binary code for each image. Furthermore, the method comprises comparing the two binary codes to quantify the level of similarity between the two images.

11 Claims, 4 Drawing Sheets

(56) References Cited

OTHER PUBLICATIONS

Fernando Alonso-Fernandez, et al., "Iris Recognition Based on SIFT Features", 2009 International Conference on Biometrics, Identity and Security, Sep. 22, 2009.*

Wen Yang, et al., "Iris Recognition Based on Location of Key Points", Biometric Authentication [Lecture Notes in Compter Science], Jul. 15, 2004.*

Fernando Alonso-Fernandez, et al., "Iris Recognition Based on SIFT Features", 2009 International Conference on Biometrics, Identity and Security, Sep. 22, 2009, pp. 1-8, IEEE, Piscataway, NJ, USA, XP031707236.

Yi Chen, et al., "Localized Iris Image Quality using 2-D Wavelets", Advances in Biometrics Lecture Notes in Computer Science, Jan. 1, 2005, pp. 373-381, Springer, Berlin, Germany, XP019026902.

Luis E. Garza Castanon, et al., "An Application of Random and Hammersley Sampling Methods to Iris Recognition", Advances in Applied Artificial Intelligence Lecture Notes in Computer Science; Jan. 1, 2006, pp. 520-529, Springer, Berlin, Germany, XP019035171.

Wen Yang, et al., "Iris Recognition Based on Location of Key Points", Biometric Authentication [Lecture Notes in Compter Science], Jul. 15, 2004, pp. 484-490, Springer-Verlag, Belin/Heidelberg, Germany, XP019007777.

Emine Krichen, et al., "A New Probabilistic Iris Quality measure for Comprehensive Noise Detection", First IEEE International Conference On Biometrics: Theory Applications, and Systems, Sep. 1, 2007, pp. 1-6, IEEE, XP031189936.

* cited by examiner

METHOD FOR COMPARING IRIS IMAGES BY THE INTELLIGENT SELECTION OF TEXTURED AREAS

CROSS-REFERENCE TO RELATED APPLICATIONS

This application is a National Stage of International patent application PCT/EP2011/071519, filed on Dec. 1, 2011, which claims priority to foreign French patent application No. FR 1004942, filed on Dec. 17, 2010, the disclosures of which are incorporated by reference in their entirety.

FIELD OF THE INVENTION

The invention relates to a method for comparing irises by the intelligent selection of textured areas and applies notably to the field of biometry and more particularly to comparison of human irises.

BACKGROUND

Biometry techniques are used for the detection and recognition of living beings. These techniques can be used in the context of applications requiring a certain level of security, such as, for example, access control at sensitive sites.

For this, a morphological analysis applied to the individuals is implemented in order to identify the physical characteristics that are specific to them. This analysis is based, for example, on the iris or the fingerprints.

For the analysis of the iris, an example of an existing analysis method is the so-called Daugman method, described in the U.S. Pat. No. 5,291,560. This method allows for the comparison between a number of digital samples representative of irises and then makes it possible to determine whether the samples correspond to the same individual. For this, there is a first step whose aim is to segment and normalize the irises followed by a step aiming to extract a binary code. The extraction of the binary code is done by applying a phase demodulation around points of application to transform the texture of the iris into a binary code. The comparison of two irises is therefore reduced to a point-by-point comparison of a number of binary codes, in which the points of the binary codes were directly associated with points of application placed on the normalized iris.

The positioning of the points of application on the normalized image of the iris can be done differently. The Daugman method as described in the U.S. Pat. No. 5,291,560 proposes to position the points of application in the left and right quadrants of the iris. The aim of this positioning is to exclude the regions of the iris in which the probability of containing artifacts is significant. This is because certain regions may contain eyelashes, eyelids or light spots. By excluding these regions, the inclusion of noise-affected information in the binary code, and therefore of their comparison being falsified, is avoided. The drawback with this approach is that the positions of the points of application are predefined and identical for all the iris images. They do not therefore allow for adaptation to the specifics of each iris.

To address this problem, L. Masek proposed, in his thesis entitled "Recognition of Human Iris Patterns for Biometric Identification", 2003, introducing a segmentation mask on the normalized iris. This mask is computed automatically for each iris by an active contours method. The aim of this mask is to cover the artifacts present in the iris. The points of application taken into account for the comparison of the irises are then placed in unmasked regions. However, this technique has limits because it is binary and uniformly processes all the unmasked regions. Thus, the regions that are highly textured or have little texture as well as the regions containing unmasked artifacts or not containing any are processed in the same way. Hereinafter in the description, the words "region" or "area" will be used to designate a normalized iris image portion.

It was then proposed to locally measure the quality in different regions of the iris and to use a weighting by these quality measurements at the moment of the comparison of these binary codes of the irises. In this description, a quality measurement corresponds, for example, to an estimation of the level of texture of a given region of the iris and its resemblance to an iris texture. This is what is described in the article by Y. Chen et al. entitled *Localized Iris Image Quality Using 2-D Wavelets*, proceeding of international conference on biometrics, Hong-Kong, China, 2006. The quality measurement is also explained in the article by E. Krichen, S. Garcia-Salicetti and B. Dorizzi entitled *A new probabilistic Iris Quality Measure for comprehensive noise detection*, IEEE First International Conference on Biometrics: Theory, Applications and Systems, Washington USA, September 2007.

The abovementioned approaches do, however, have drawbacks. For example, the quality measurement presented in the article by Y. Chen et al. does not allow for processing of the artifacts, unlike that of Krichen. As for the quality measurement in the article by E. Krichen et al., this is not robust when used to implement a weighting in the comparison of binary codes and to do so, for example, when the regions of the iris are of very poor quality, notably when these regions have little texture. Indeed, this quality measurement may allocate very low quality values to regions of the iris if these regions have little texture. Now, some irises intrinsically include a significant proportion of regions with little texture. Weighting these regions by low quality scores amounts to reducing the quantity of information available for the comparison, which skews the result of said comparison.

Note: conversely, the method that we are proposing requires N points to be taken into account for the comparison even for irises with little texture, which prevents having skewed comparison results.

Other iris recognition techniques not based on the Daugman system do also exist. Take, for example, the case of the system based on the correlation described in the patent EP 08788209. Although this last solution is more robust to degraded iris images than the Daugman system, it is much more complex and costly in computation time.

SUMMARY OF THE INVENTION

One aim of the invention is notably to overcome the abovementioned drawbacks.

To this end, the subject of the invention is a method for comparing at least two iris images comprising a step determining M measurements $q_{i,j}^{(1)}$ representative of the quality level associated with M regions making up the first image, said regions being centered on M measurement points, a step determining M measurements $q_{i,j}^{(2)}$ representative of the quality level associated with M regions making up the second image. Said measurements are centered on M measurement points, the M measurements of the second image corresponding to the M measurements of the first image by the fact that the M measurement points of the second image correspond to the M measurement points of the first image. The method comprises a step for merging the quality measurements $q_{i,j}^{(1)}$, $q_{i,j}^{(2)}$, M merged measurements $q_{i,j}^{(f)}$ being obtained by the combination of two corresponding measurements belonging to the two images. The method also comprises a step for selecting the N regions exhibiting the N highest quality levels. The method also comprises a step of encoding the two images by using the N selected regions so as to obtain a binary code for each image. Furthermore, the method comprises a step for comparing the two binary codes so as to quantify the level of similarity between the two images.

According to one aspect of the invention, the two images are segmented and normalized.

According to another aspect of the invention, the measurement points are distributed uniformly over the iris images.

In one embodiment of the invention, a merged measurement $q_{i,j}^{(f)}$ associated with a given region is determined by selecting one of the measured values $q_{i,j}^{(1)}$, $q_{i,j}^{(2)}$ associated with that same region, the value corresponding to the lowest quality level being chosen.

Alternatively, a merged measurement $q_{i,j}^{(f)}$ associated with a given region is determined by weighting the measurements of the two images $q_{i,j}^{(1)}$ and $q_{i,j}^{(2)}$ corresponding to that region.

Alternatively, a merged measurement $q_{i,j}^{(f)}$ associated with a given region is determined by using the following expression:

$$q_{i,j}^{(f)} = \sqrt{q_{i,j}^{(1)} \times q_{i,j}^{(2)}}.$$

According to one aspect of the invention, the quality measurements $q_{i,j}^{(1)}$ are stored in a matrix Q1, the quality measurements $q_{i,j}^{(2)}$ are stored in a matrix Q2 and the merged measurements $q_{i,j}^{(f)}$ are stored in a matrix Qf.

The binary codes are obtained, for example, by applying a phase demodulation around N points of application corresponding to the center of the N selected regions.

In one embodiment, the comparison step determines a similarity score corresponding to the Hamming distance between the two binary codes.

The result of a measurement is, for example, a real number between 0 and 1, the value 1 being achieved for a maximum quality of the measured region.

According to one aspect of the invention, the merging, selection, and encoding steps are applied for a number of translated versions of the normalized iris images.

The invention has the notable advantage of making it possible not to use any mask for concealing the poor quality areas of the iris images. It also offers the advantage of delivering good comparison performance levels in the presence of irises that naturally have little texture.

BRIEF DESCRIPTION OF THE DRAWINGS

Other features and advantages of the invention will become apparent from the following description given as a nonlimiting illustration, and in light of the appended drawings in which.

DETAILED DESCRIPTION

Figure 1:
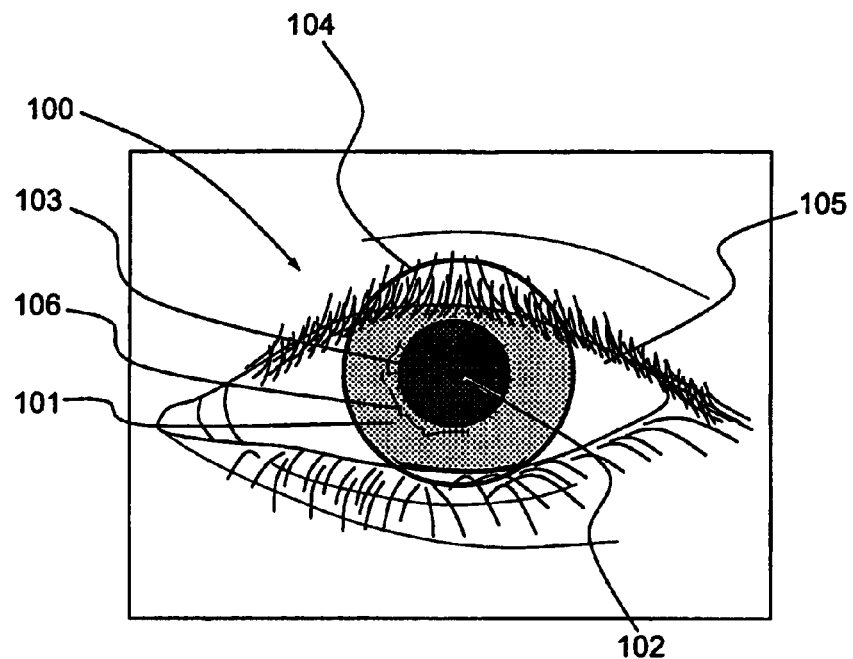
FIG. 1 represents an eye and the area usually used for the iris comparison.

FIG. 1 shows an eye and the area usually used for the iris comparison. On the eye 100 given as an example, the iris 101 and the pupil 102 can be distinguished. An area defined by the surface between two circles 103, 104 comprising the visible part of the iris can be used to segment the iris, that is to say, to isolate it from the white of the eye 105 and from the pupil 102. An iris comprises areas that are textured differently. Thus, in the example of FIG. 1, the area 106 is highly textured, that being represented by black lines.

Figure 2:
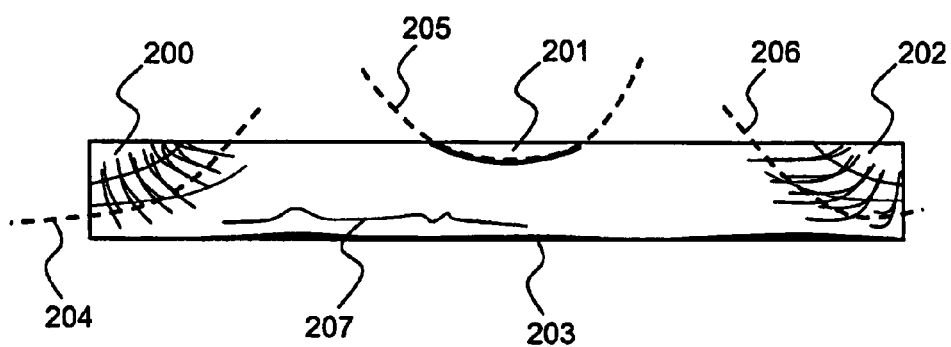
FIG. 2 gives an example of a normalized iris image.

FIG. 2 gives an example of a normalized iris image. A normalized iris image corresponds to the digital image of an iris run then adjusted to a standard format, for example a format comprising 64 by 512 pixels.

As explained previously, regions 200, 201, 202 contain artifacts, for example eyelashes and eyelid portions, which are added to the useful area 203 for the comparison. In this area appears a highly textured area represented by a line 207. The normalized iris image can be associated with a mask making it possible to separate 204, 205, 206 the useful area 203 from the areas containing artifacts 200, 201, 202.

Figure 3:
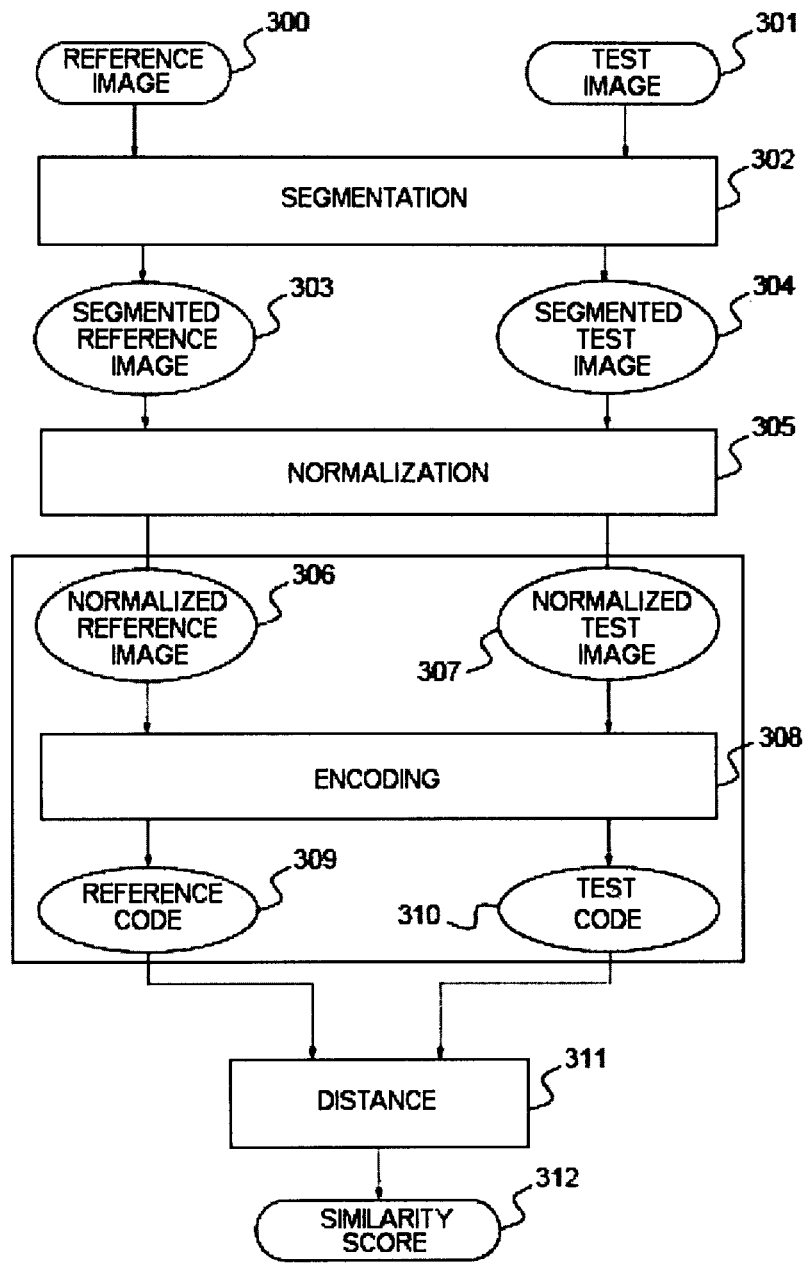
FIG. 3 shows a diagram illustrating how the Daugman iris comparison method operates.

FIG. 3 gives a diagram illustrating how the Daugman iris comparison method operates.

The aim of this method is to determine whether two iris images belong to the same person. Thus, a test iris image 301 is compared to a reference iris image 300. A first step is used to segment 302 the irises of these two images, that is to say, to isolate each iris from the white of the eye and from the pupil.

During this step, and optionally, a segmentation mask specific to each segmented image can be determined.

The reference and test images after segmentation 303, 304 are then normalized 305.

It is known from the prior art that, after the normalization 305, different translations can be applied to the test iris image. The encoding 308 and comparison 312 steps described below are then applied to each translated image, the best similarity score being retained. The aim of these translations is to adjust the test image relative to the reference image. However, in order to simplify the explanation without limiting the scope of the invention, a single untranslated version of the test image is considered hereinafter in the description.

An encoding step 308 provides a reference code 309 for the reference image and a test code 310 for the test image.

These codes are then compared by computing, for example, their Hamming distance 311. The result of this comparison is called similarity score 312 and is used to decide whether the test iris corresponds to the reference iris, the correspondence being established if the similarity score exceeds a predetermined value.

The Daugman iris comparison method can be enhanced by using localized quality measurements in the normalized iris image. These quality measurements are then used to select automatically, for each pair of irises, the position of the points of application. This automatic selection is performed in such a way that the chosen points of application belong to regions which do not include artifacts. Furthermore, the regions with the richest texture are prioritized.

To correctly complete this selection, the quality is assessed locally on a chosen number of points. These points are, for example, distributed uniformly over the entire normalized iris image. The N points exhibiting the best quality are then retained as points of application for the phase demodulation.

This method is an enhancement of the Daugman method, which makes it simple to implement and enables it, by its simplicity, to be executed rapidly. Advantageously, the method according to the invention automatically adjusts the position of the points of application to each iris. This automatic adaptation makes it possible to avoid having regions containing artifacts taken into account and favors the more textured regions. Furthermore, the method is robust in the cases where the whole of the iris image is of poor quality.

The iris comparison method according to the invention repeats the main steps of the Daugman method as presented using FIG. 3. The enhancements occur before between the iris image normalization and encoding steps. Thus, after normalization of the reference and test images, a succession of steps make it possible to prepare the encoding so that the reference and test codes obtained allow for a high performance detection, that is to say, a detection with a high probability of correct detection.

The method according to the invention relies on quality measurements performed on the normalized reference and test images. A first set of quality measurements is associated with the normalized reference image and a second set of quality measurements is associated with the normalized test image. This measurement is obtained, for example, by comparing a region of the normalized iris image to the samples of a database of textured images. The region measured is, for example, centered on a measurement point. Such a method is described in the article by E. Krichen, S. Garcia-Salicetti and B. Dorizzi mentioned previously. The result of a measurement is, for example, a real number between 0 and 1, the value 1 being achieved for a maximum quality.

Figure 4:
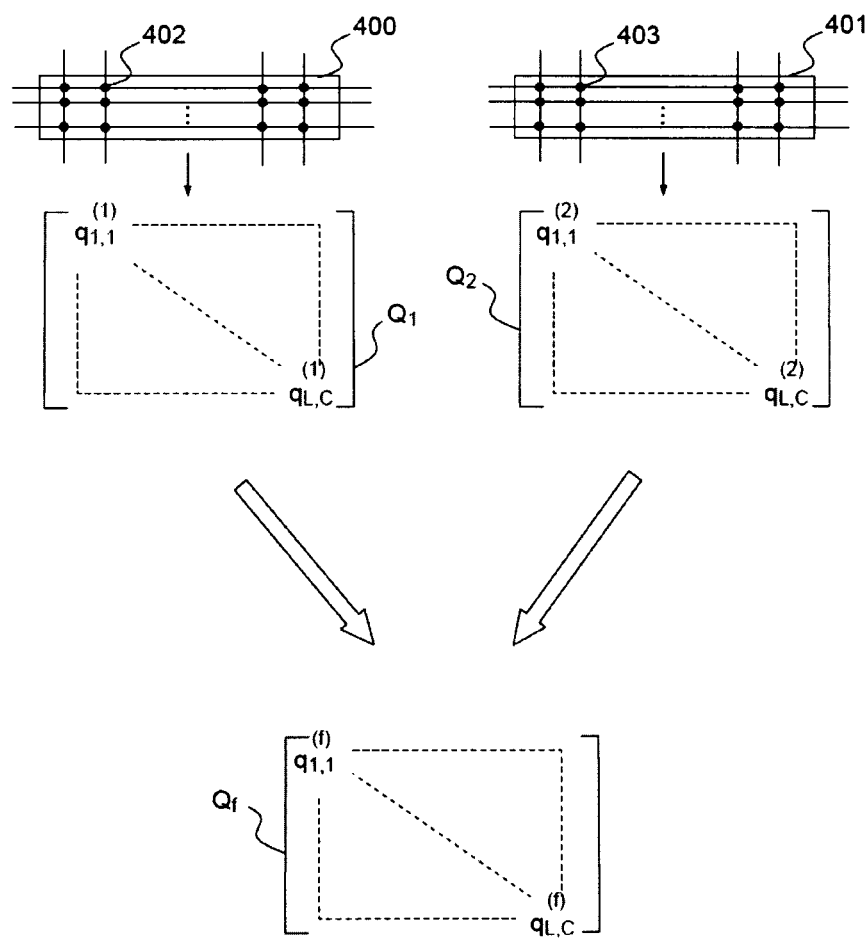
FIG. 4 illustrates the quality measurement merging principle.

FIG. 4 illustrates the quality measurement merging principle. The measurements performed on a normalized image can be carried out on M points 402, 403 distributed over the whole of the normalized reference image 400 and over the normalized test image 401. This distribution is, for example, uniform.

The measurements associated with the normalized reference image are, for example stored in a matrix Q1 made up of M elements $q_{i,j}^{(1)}$ and the measurements associated with the normalized test image in a matrix Q2 made up of M elements $q_{i,j}^{(2)}$. These matrices comprise L rows and C columns so that M=L×C. The following then applies: $i \in [1,L]$ and $j \in [1,C]$.

The measurements associated with these two images are then merged. The aim of this merging is to determine the areas on which a reliable detection can be carried out. The result of this merging leads to a merging matrix Qf, the elements $q_{i,j}^{(f)}$ of this matrix resulting from the elements of the matrices Q1 and Q2.

The elements $q_{i,j}^{(f)}$ of the merging matrix Qf can be determined in different ways, for example by using the following expression:

$$q_{i,j}^{(f)} = \min(q_{i,j}^{(1)}, q_{i,j}^{(2)}) \qquad (1)$$

in which the function min(a,b) has the result a or b, the smallest number beings chosen.

Alternatively, the elements $q_{i,j}^{(f)}$ can be chosen by weighting the corresponding elements $q_{i,j}^{(1)}$ and $q_{i,j}^{(2)}$ of the matrices Q1 and Q2.

A third possibility is to use the following expression:

$$q_{i,j}^{(f)} = \sqrt{q_{i,j}^{(1)} \times q_{i,j}^{(2)}} \qquad (2)$$

These three merging possibilities are given by way of example. Other methods for determining the merged values $q_{i,j}^{(f)}$ can also be chosen for the implementation of the invention.

The merged values $q_{i,j}^{(f)}$ are then used to select the textured areas that are most relevant for the iris comparison.

Figure 5:
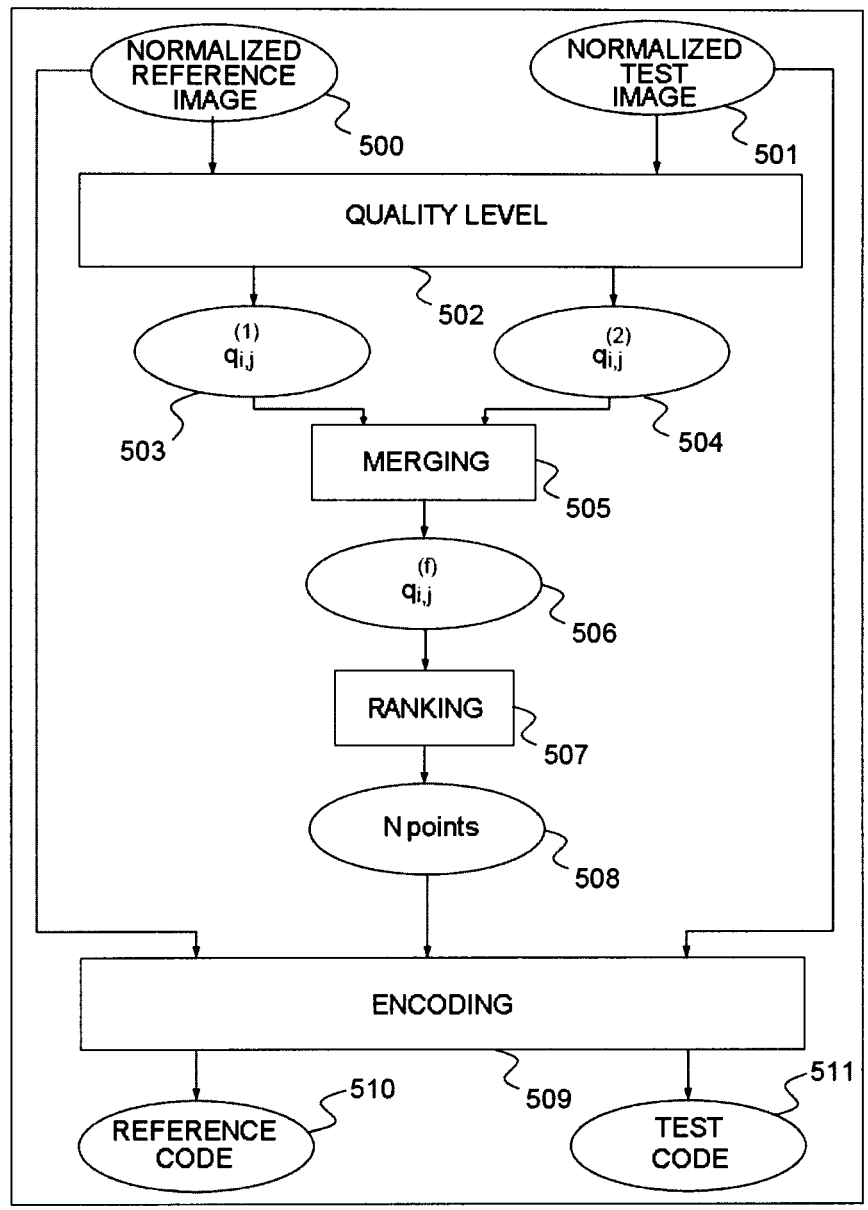
FIG. 5 gives an exemplary implementation of the method according to the invention.

FIG. 5 exhibits an exemplary implementation of the method according to the invention. The iris images used as reference images and test images are segmented and normalized. The segmentation and normalization operations can be applied at the same time to the reference and test images or else at different times. Following these operations, the method according to the invention comprises steps for selecting the textured areas that are most relevant for the iris comparison.

For each normalized image of the iris M points distributed over each image are considered. These M points are distributed, uniformly for example, according to a grid, called comparison grid. M quality measurements $q_{i,j}^{(1)}$ are determined 502 for the normalized reference image 500. The M quality measurements $q_{i,j}^{(2)}$ 504 are also determined for the normalized test image 501. For this, a quality measurement is associated with each of the M points of an image by applying a statistical learning model to a thumbnail image centered around this point. As indicated previously, this measurement may be between 0 and 1 and will have the value 1 for a thumbnail image of ideal quality. Its value will decrease if the thumbnail image has little texture or if it includes artifacts such as occlusions by eyelids, eyelashes or light spots. The measurements $q_{i,j}^{(1)}$ 503 and $q_{i,j}^{(2)}$ 504 are representative of a quality level in a given area of the measured image. As explained previously, these measurements are stored, for example, in a matrix Q1, for those associated with the normalized reference image and in a matrix Q2 for those associated with the normalized test image.

The measurements $q_{i,j}^{(1)}$ 503 and $q_{i,j}^{(2)}$ 504 are then merged 505. Two quality measurements $q_{i,j}^{(1)}$ and $q_{i,j}^{(2)}$ are available for each of the M points of the iris comparison grid. These two values are merged, for example by retaining their minimum value. In this way, a single value $q_{i,j}^{(f)}$ is associated with a point of the comparison grid for the pair of irises concerned.

The values obtained $q_{i,j}^{(f)}$ are, for example, stored in a merging matrix Qf.

The textured areas making up the image are then ranked on the basis of the merged measurements $q_{i,j}^{(f)}$.

For example, N points of application are selected from the M measured and ranked points 507. These N points correspond to the points of the comparison grid exhibiting the highest merged quality measurement values. They are ranked according to their quality level, for example from the lowest level to the highest level.

In other words, for each pair of irises, a local quality measurement has been associated with each of the M points of the comparison grid, said points being, for example, distributed uniformly over the entire image. A choice is then made to use, from these M points, the N best quality points as points of application used in the conversion of each iris into binary code.

The choice of the value of N can be optimized so that the number of points of application makes it possible to adequately retain degrees of freedom in the code of the iris and for the poor quality areas not to be taken into account in computing the similarity score.

The normalized images 509 are then encoded. A reference code 510 and a test code 511 are thus generated. They are then used to compare the images and compute the similarity score. For this, the codes 510, 511 are compared by computing, for example, their Hamming distance. The result of this comparison, that is to say, the similarity score, is used to decide whether the test iris corresponds to the reference iris, for example by comparing this score to a predetermined value.

The invention claimed is:

1. A method for comparing at least two iris images comprising a step determining M measurements $q_{i,j}^{(1)}$ representative of the quality level associated with M regions making up the first image, said regions being centered on M measurement points, a step determining M measurements $q_{i,j}^{(2)}$ representative of the quality level associated with M regions making up the second image, said measurements being centered on M measurement points, the M measurements of the second image corresponding to the M measurements of the first image by the fact that the M measurement points of the second image correspond to the M measurement points of the first image, said method comprising: merging the quality measurements $q_{i,j}^{(1)}$, $q_{i,j}^{(2)}$, M merged measurements $q_{i,j}^{(f)}$, being obtained by the combination of two corresponding measurements belonging to the two images;

selecting N regions exhibiting the N highest quality levels;

encoding the two images by using the N selected regions so as to obtain a binary code for each image; and comparing the two binary codes so as to quantify the level of similarity between the two images.

2. The method according to claim 1, wherein the two images are segmented and normalized.

3. The method according to claim 1, wherein the measurement points are distributed uniformly over the iris images.

4. The method according to claim 1, wherein a merged measurement $q_{i,j}^{(f)}$ associated with a given region is determined by selecting one of the measured values $q_{i,j}^{(1)}$, $q_{i,j}^{(2)}$ associated with that same region, the value corresponding to the lowest quality level being chosen.

5. The method according to claim 1, wherein a merged measurement $q_{i,j}^{(f)}$ associated with a given region is determined by weighting the measurements of the two images $q_{i,j}^{(1)}$ and $q_{i,j}^{(2)}$ corresponding to that region.

6. The method according to claim 1, wherein a merged measurement $q_{i,j}^{(f)}$ associated with a given region is determined by using the following expression:

$$q_{i,j}^{(f)} = \sqrt{q_{i,j}^{(1)} \times q_{i,j}^{(2)}}.$$

7. The method according to claim 1, wherein the quality measurements $q_{i,j}^{(1)}$ are stored in a matrix Q1, the quality measurements $q_{i,j}^{(2)}$ are stored in a matrix Q2, and the merged measurements $q_{i,j}^{(f)}$ are stored in a matrix Qf.

8. The method according to claim 1, wherein the binary codes are obtained by applying a phase demodulation around N points of application corresponding to the center of the N selected regions.

9. The method according to claim 1, wherein the comparison step determines a similarity score corresponding to the Hamming distance between the two binary codes.

10. The method according to claim 1, wherein the result of a measurement is a real number between 0 and 1, the value 1 being reached for a maximum quality of the measured region.

11. The method according to claim 2, wherein the merging, selection and encoding steps are applied for a number of translated versions of the normalized iris images.

* * * * *